C. MYERS.
Plow.

No. 164,471.

Patented June 15, 1875.

Witnesses:
M. Gardner
A. C. Rawlings

Inventor:
Christian Myers,
By Theodore Mungen,
His Attorney

THE GRAPHIC CO.PHOTO-LITH.39 & 41 PARK PLACE, N.Y.

UNITED STATES PATENT OFFICE.

CHRISTIAN MYERS, OF MARYSVILLE, CALIFORNIA, ASSIGNOR OF ONE-HALF HIS RIGHT TO GEORGE B. HORNISH, OF SAME PLACE.

IMPROVEMENT IN PLOWS.

Specification forming part of Letters Patent No. 164,471, dated June 15, 1875; application filed April 21, 1875.

*To all whom it may concern:*

Be it known that I, CHRISTIAN MYERS, of Marysville, in the county of Yuba and State of California, have invented a new and useful Improvement in Plows; and I hereby declare the following to be a full, clear, and exact description of the same, reference being had to the accompanying drawing, making part of this specification, in which—

Figure 1:
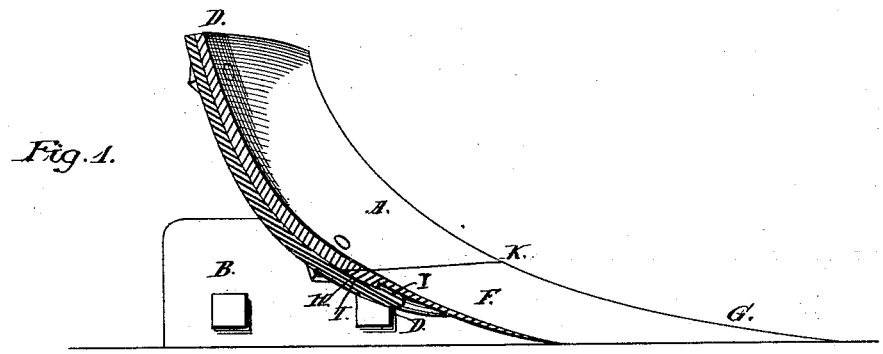
Figure 2:
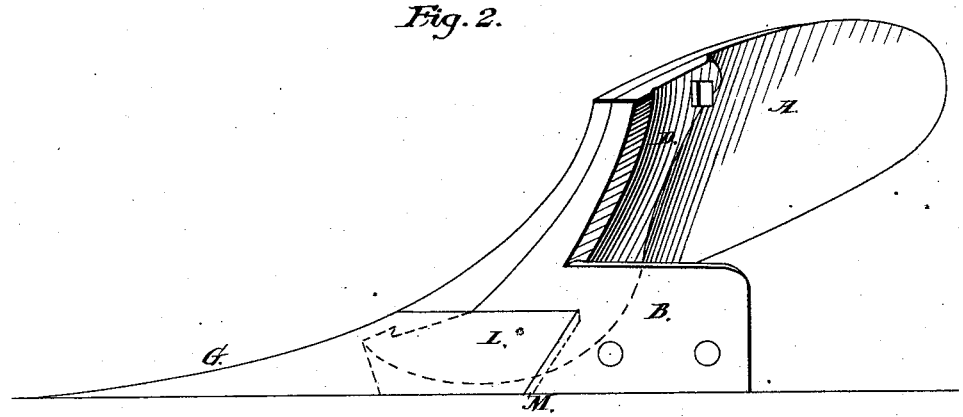
Figure 3:
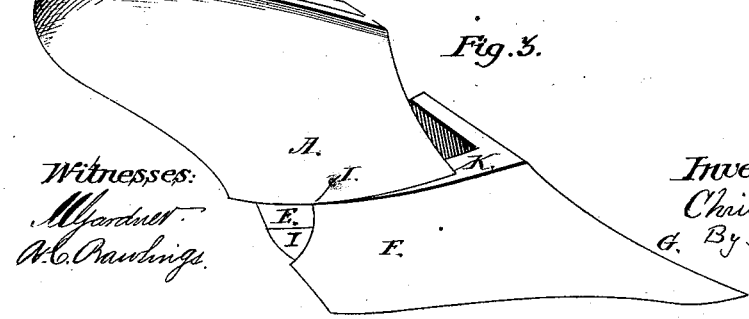

Figure 1 is a sectional elevation embodying the improvements in my invention. Fig. 2 is an elevation from the land-side, and Fig. 3 is a view showing the plowshare partially withdrawn from the dovetail joint.

This invention relates to an improvement in plows; and it consists of a detachable plow-share having a land-side and a mold-board wing beveled upon their upper edges, the mold-board wing being provided with a tongue upon the inner face of its beveled upper edge, in combination with a mold-board beveled upon its lower edge to lap over the bevel upon the upper edge of the mold-board wing of the plowshare, a sectional land-side adapted to receive the land-side wing of the plowshare, and a frog having a projecting lip upon its lower mold-board edge, which, together with the lower edge of the mold-board, form a groove for the reception of the tongue upon the land-side wing of the plowshare; the objects of the invention being to dispense with the bolts, screws, hooks, and keys heretofore used to secure the share to the frog, and to provide a share that may be readily removed for the purposes of sharpening or repairing it, and as readily replaced when these operations have been performed, all of which will hereinafter more fully appear.

In the accompanying drawing, the mold-board A and the land-side B are secured to the frog D by bolts and nuts, in the usual manner, and are only to be removed when worn out. The lower edge of the mold-board A is beveled from its inner to its outer side downwardly, and forms the upper side of the groove E. The upper edge of the wing F of the share G is beveled to fit the lower edge of the mold-board A. The share G has the tongue H at the rear side and upper edge of its wing F. The lower side I of the groove E is cast upon the frog D, and is covered by the wing F when the share G is in place. The tip I of the tongue H is entered into the mouth K of the groove E, and is pushed back in said groove until the land-side wing L of the share G enters the recess M, and the wing F in appearance forms a part of the mold-board A.

To remove the detachable share G it is only necessary to strike the wing F a slight blow upon its heel, when it can be drawn forward and removed. The bolts which secure the mold-board A may be tightened or loosened to regulate the pressure of the lower edge of the mold-board upon the upper edge of the wing F of the share G when the latter is in place.

Having thus described my invention of improvements, what I claim as new and useful, and desire to secure by Letters Patent, is—

The plowshare G, having the land-side wing L and mold-board wing F, beveled upon their upper edges, and the latter wing provided with the tongue H, in combination with the mold-board A, beveled upon its lower edge, the land-side B, cut away to receive the wing L, and the frog D, having the lip or projection I upon its lower mold-board edge, the several parts being constructed and operating substantially as and for the purpose hereinbefore described.

In testimony that I claim the foregoing improvements, as above described, I have hereunto set my hand and seal this 10th day of April, 1875.

CHRISTIAN MYERS. [L. S.]

Witnesses:
J. C. BRADLEY,
E. HAMILTON.